Nov. 26, 1963 S. W. ALDERFER 3,111,728
MAGNETICALLY ADHERENT RESILIENT ARTICLES
Filed Aug. 2, 1960
FIG. 1
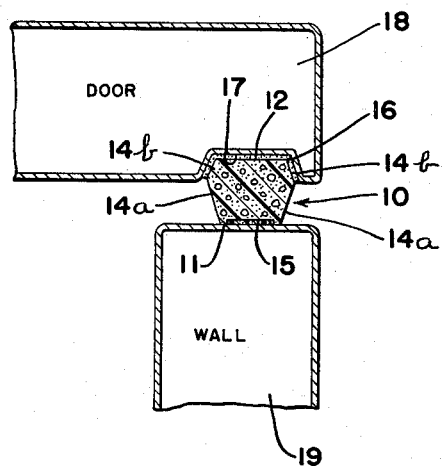
FIG. 2
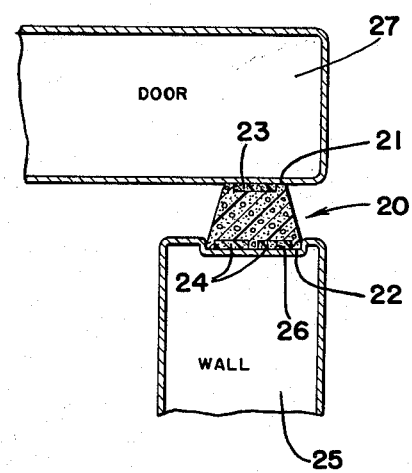
FIG. 3
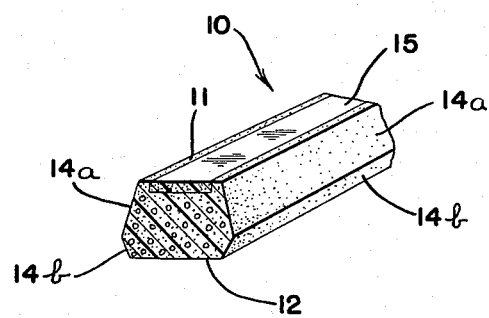
FIG. 4
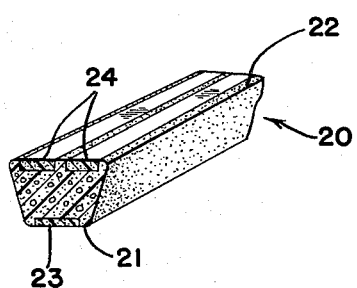
FIG. 5
FIG. 6
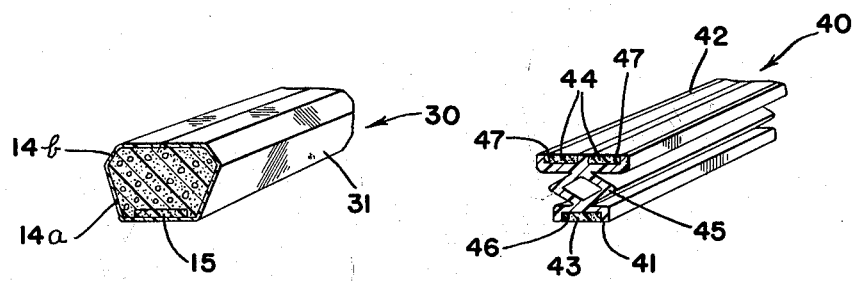
INVENTOR.
STERLING W. ALDERFER
BY
ATTORNEYS

United States Patent Office 3,111,728
Patented Nov. 26, 1963

3,111,728
MAGNETICALLY ADHERENT RESILIENT
ARTICLES
Sterling W. Alderfer, 464 N. Portage Path,
Akron 3, Ohio
Filed Aug. 2, 1960, Ser. No. 46,966
3 Claims. (Cl. 20—69)

This application is a continuation-in-part of a prior application, Serial No. 841,328, filed September 21, 1959. FIGS. 1, 3 and 5 of this application relate to articles disclosed and claimed in prior application, Serial No. 841,328, and are now in this application because of a requirement for restriction under Title 35, U.S.C., sec. 121. The articles of FIGS. 2, 4 and 6 of this application are not disclosed in said prior application, Serial No. 841,328.

The present invention relates to resilient articles which are magnetically adherent and which may be used as gaskets for sealing refrigerator doors.

The objects and advantages of the present invention will be apparent in view of the following detailed description of the invention, and the drawings showing various forms thereof.

In the drawings:

FIG. 1 is a sectional plan view showing the use of one form of article according to the invention as a sealing gasket;

FIG. 2 is a view similar to FIG. 1, showing the use of another form of article according to the invention;

FIG. 3 is a perspective view of the article shown in FIG. 1;

FIG. 4 is a perspective view of the article shown in FIG. 2;

FIG. 5 is a perspective view of the article of FIG. 2 with a film covering; and

FIG. 6 is a perspective view of a modified form of the article of FIG. 4.

An article according to the invention, indicated generally at 10 in FIGS. 1 and 3, at 20 in FIGS. 2 and 4, and 30 in FIG. 5 and at 40 in FIG. 6, comprises a flexible or non-rigid article of any desired or suitable length having a resilient body and at least one strip of permanently magnetized material extending longitudinally of the body at or adjacent the surface thereof.

Referring to FIG. 3, the article 10 is a strip or non-rigid block of a resilient flexible foamed cellular polymer, such as a urethane foam, having a face portion 11 and a base portion 12. As shown, each side of the foam strip 10 may have intersecting or outwardly tapered flat surfaces 14a and 14b which will provide sealing effect if the article is used as a gasket or sealing member. Secured or adhered longitudinally to the face portion 11 of the strip 10 is a permanently magnetized flexible strip 15 which has been specially compounded and extruded in the desired shape.

In a broad sense, the foam core of the article 10 may be formed by reactant materials selected from those known classes of compounds which will chemically foam or react, alone or in combination with others, with or without a catalyst or a gasifiable substance, so as to form a resilient foam material having a defined cellular structure.

The preferred material for the foam core of an article 10 is an isocyanate, polyurethane, or "urethane" foam produced by reacting diisocyanates with a suitable polyol or mixture of polyols. Foaming is caused by evolution of carbon dioxide, which is liberated internally when measured amounts of water are added to an isocyanate-polyol mixture, depending on the type of polyol selected and its ratio to isocyanate, foams of various densities ranging from less than 1 to more than 40 lb./cu. foot may be obtained.

The diisocyanate of greatest commercial importance today is TDI (tolylene diisocyanate) which consists of two common isomers. The mixture most commonly used contains 80% of the 2,4 isomer and 20% of the 2,6 isomer. This is the preferred composition because it is the product resulting from the dinitration of toluene, reduction and phosgenation.

A diisocyanate may be reacted with polyesters, polyethers, castor oil, simple glycols, drying oils and other similar compounds which are poly functional and hydroxyl-rich. The polyesters are preferred because their urethane foams have a high tensile strength and at the present state of the art are the easiest to produce. A recent variation on the polyester-based foams has been the use of dimer acids, formed by the reaction of linoleic acid in the presence of an alkali. Urethane foams based on the dimer acids are highly resistant to hydrolytic agents and exhibit a high degree of resilience to prolonged periods. If practice of the invention requires a high degree of low temperature flexibility, the polyether-based foams may be used.

The preparation of a suitable urethane foam for practice of the invention as disclosed herein is deemed well within the abilities of those skilled in this art. However, by way of example, a suitable formulation would include 25 parts of diisocyanate, 100 parts of polyester, 8 to 10 parts of water, and 1 to 3 parts of a catalyst (such as triethyl amine). The ingredients may be all mixed at one time, with good agitation, and just as the evolution of $CO_2$ begins, the liquid mixture is poured into the cavity of a suitable mold. The foaming reaction will proceed without the application of heat or pressure.

The permanently magnetized flexible strip 15, associated with the face portion 11 of the foam strip, is a recently developed product of The B. F. Goodrich Co., Akron, Ohio, as is distributed under the name "Koroseal Flexible Magnetic Strip." Insofar as can be determined, the product is plasticized vinyl resin based material having magnetizable particles embedded therein. The product is extruded in strips of any desired length and cross-sectional shape. The product is actually an electrical insulator but unlike iron-type magnets, it can be spot-magnetized or shape-magnetized for the most efficient use. For example, the material can have poles across the width of thickness, or along one face with the two poles along the edge, or along one face with alternating poles, or in long continuous lengths. For purposes of the present invention, the preferred arrangement is one where the north pole runs continuously the length of the strip on one edge and the south pole runs continuosuly on the opposite edge.

FIG. 1 shows the use of a length of article 10 as a gasket or sealing member. The base 12 is attached, as by a suitable adhesive layer 16, to a preferably recessed marginal portion 17 of a door 18. The magnetized strip 15 will magnetically adhere to an "armature" or iron-containing wall portion 19.

Referring to FIGS. 2 and 4, the article 20 has a resilient core, such as the foam core of article 10 of FIGS. 1 and 3, a face portion 21 and a base portion 22. The article 20 is intended to be used as a gasket or sealing member without adhesive attachment of the base portion 22. As shown, the face portion 21 has secured or adhered longitudinally thereon a permanently magnetized flexible strip 23, similar to the strip 15 of article 10. The base portion has secured or adhered thereto a magnetic material of greater strength; that is, of greater or stronger magnetic attraction than the strip 23 on the face portion. As shown, the magnetic material on the base portion 22 comprises two permanently magnetized flexible strips 24 of the same or similar material as strip 23 but having a larger surface area and therefore a stronger magnetic attraction than strip 23.

Referring specifically to FIG. 2, it is preferred that the wall portion 25 have a slightly recessed marginal portion 26 for positioning of the base portion 22 of the article 20 by attraction of the magnetic strips 24. The door 27 will be attracted by the lesser strength magnetic strip 23 to maintain a normally closed condition. If desired, the recessed portion 26 could be provided on the door 27 with the face portion 21 of the article 20 directed toward the wall portion 25.

Referring to FIG. 5, the article 30 is similar to the article 10 of FIG. 3, but with the addition of a flexible cover sheet 31 which completely encases the foam core or center and has edges joined preferably along the base portion 12 of the article. The flexible sheet 31 is preferably a non-rigid film of polyvinyl chloride, manufactured by calendering, casting, or extrusion and having a preferred thickness of 5 to 10 mils. Such films are well known to the art and may be provided with textured or decorative surfaces as desired. Other non-rigid plastic films, such as polyethylene or polystyrene, or flexible fabric sheeting, such as cotton duck could also be used if desired.

Referring to FIG. 6, the article 40 is similar to the article 20 of FIG. 4 in having a face portion 41 and a base portion 42. The face portion 41 has a permanently magnetized flexible strip 43, similar to strip 23. The base portion 42 has a magnetic material such as strips 44, similar to strips 24, of greater or stronger magnetic attraction than the strip 43 on the face portion.

The requisite resiliency for article 40 is supplied by a suitably shaped medial or body portion 45 interconnecting the face portion 41 and base portion 42. Except for the magnetic strips 43 and 44, of a material as described above, the article 40 may be an extrusion of a suitable plastic material, such as a vinyl resin based material, having suitable groves 46 and 47 therein to accommodate the magnetic strips 43 and 44. The strips 43 and 44 are preferably adhesively secured in the respective grooves 46 and 47. However, if desired, the magnetic strips 43 and 44 could be retained and protected by a thin layer of plastic material (not shown). As shown, the medial portion 45 is diamond-shaped in cross-section. If desired, other hollow and resilient shapes, such as a tubular or annular form, could also be employed to provide the requisite resiliency. Further, the hollow area of portion 45 could be filled with a foam, as described above.

While several embodiments of the concepts of the invention have been suggested and disclosed to those skilled in the art, it will be apparent that further modifications of the invention could be made within the scope thereof. Therefore, it is intended that the scope of the invention be defined only by the scope of the appended claims.

What is claimed is:

1. An elongated sealing gasket comprising, a length of material having a resilient body portion, a face portion, and a base portion, a strip of flexible magnetic material extending longitudinally of said face portion, and at least one strip of magnetic material extending longitudinally of said base portion, the magnetic material on said base portion having greater magnetic strength than the magnetic material on said face portion.

2. A sealing strip adapted for magnetic sealing of the space between opposing iron surfaces, the said sealing strip comprising an elongated resilient body having two faces, each of said faces having a strip of flexible magnetic material along its length, the magnetic material on one face being of substantially greater magnetic strength than that on the other face.

3. A sealing strip adapted for magnetic sealing of the space between opposing iron surfaces, the said sealing strip comprising an elongated resilient body having two faces, each of said faces having a strip of flexible magnetic material along its length, the magnetic material on one face being of substantially greater magnetic strength than that on the other face, and a film of impervious flexible material surrounding the exposed surface of said resilient body and said strips of flexible magnetic material.

References Cited in the file of this patent

UNITED STATES PATENTS

| | | |
|---|---|---|
| 1,641,880 | Cohen | Sept. 6, 1927 |
| 2,797,370 | Bennett | June 25, 1957 |
| 2,825,447 | Kurland | Mar. 4, 1958 |
| 2,959,832 | Baermann | Nov. 15, 1960 |

FOREIGN PATENTS

| | | |
|---|---|---|
| 538,226 | Great Britain | July 25, 1941 |
| 1,193,769 | France | May 4, 1959 |